United States Patent Office 3,730,771
Patented May 1, 1973

3,730,771
ELECTRIC ACCUMULATOR
Helmut Tannenberger, Geneva, and Jean-Claude Charbonnier, Chene-Bougeries, Switzerland, assignors to Battelle Memorial Institute, Carouge, Geneva, Switzerland
Filed Oct. 8, 1970, Ser. No. 79,204
Claims priority, application Switzerland, Oct. 9, 1969, 15,148/69
Int. Cl. H01m 35/00
U.S. Cl. 136—6                            20 Claims

ABSTRACT OF THE DISCLOSURE

An electric accumulator comprises anodic and cathodic compartments which respectively contain an anode made of an alkali or alkaline-earth metal or lanthanum and a cathode made of a sintered solid body including an electronic conductor and an electron acceptor. The two compartments are separated by a fluidtight wall made of a solid substance in which the metal used for the anode can migrate relatively freely at ambient temperature in the form of positive ions. The cathodic compartment contains a solution of a salt of the anode metal in a polar organic solvent capable of dissolving a virtual reaction product formed during the discharge of the accumulator.

---

Figure 1:
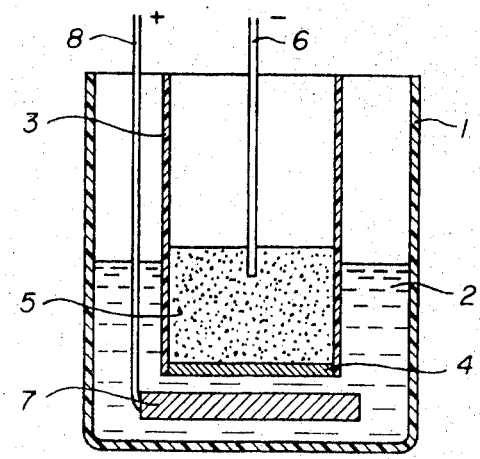

This invention relates to an electric accumulator of the kind comprising an anodic compartment containing an anode made of a metal selected from among the alkali and alkaline-earth metals and lanthanum and a cathodic compartment containing an electron-accepting cathode, these two compartments being separated by a fluidtight dividing wall or separator formed of a solid substance in which the metal of the anode can migrate relatively freely, at ambient temperature, in the form of positive ions.

Such an accumulator is described in French Pat. No. 1,490,198. As a substance enabling the alkali metal to migrate it uses beta alumina, approximately composed of $Na_2O \cdot 11Al_2O_3$, in which the sodium can be partly substituted by another alkali metal. This known accumulator must be kept, in order to work, at a temperature at least equal to the melting point of the anode metal and to that of a virtual reaction product formed in the cathodic compartment during discharge thereof. This is, firstly, to facilitate movement of the anode metal and, secondly, to prevent the reaction product formed during discharge from accumulating in the cathodic compartment between the cathode and the dividing wall. It should be noted that, in this case, the molten mixture of the reaction product and of the substance used as an electron acceptor acts as a liquid electrolyte. Consequently, this accumulator cannot be used at ambient temperature. Moreover, as regards the electron acceptor, it is limited to the use of substances that are liquid at the working temperature of the accumulator.

The accumulator according to our present invention is not subject to the aforestated double limitation and can operate at ambient temperature. Its cathodic compartment contains a solution of at least one salt of the anode metal in a polar organic solvent capable of dissolving the reaction product formed during discharge of the accumulator, its cathode being constituted by a sintered solid body comprising an electronic conductor and an active material consisting essentially of a cathodically reducible compound acting as an electron acceptor.

As an alkali metal, we can use the following four metals: lithium, sodium, potassium and rubidium. As an alkaline-earth metal we use calcium, strontium and barium.

A preferred electron acceptor is a reducible compound of transition metal, in particular a halide, an oxide or a sulphide of one of the following metals: iron, nickel, cobalt, chromium, copper and vanadium. This compound can also be a mercury or silver salt. Among the transition-metal halides we prefer to use fluorides, in particular the following: $FeF_2$, $FeF_3$, $CuF_2$, $NiF_2$ and $CoF_3$.

The separator permeable to ions of the anode metal can be made of any substance having a crystalline lattice structure which lends itself to such migration at ambient temperature with a rather specific resistance. The so-called "sodium beta alumina" composition, whose approximate formula is $NaO \cdot 11Al_2O_3$, is particularly permselective to sodium ions. By replacing in known manner part of the sodium in the crystalline lattice structure of the beta alumina with another alkali or alkaline-earth metal, varieties of beta alumina can be obtained which are permselective to the ions of alkali or alkaline-earth metals other than sodium.

Instead of sodium beta alumina, we can also use alkali beta alumina having the following approximate compositions: $K_2O \cdot 11Al_2O_3$, $Rb_2O \cdot 11Al_2O_3$, $CsO \cdot 11Al_2O_3$ and $Li_2O \cdot 11Al_2O_3$. Likewise, compositions of beta alumina and the oxides of alkaline-earth metals, in particular $CaO \cdot 6Al_2O_3$. Also suitable is lanthanum-oxide beta alumina, i.e. the composition of approximate formula $La_2O_3 \cdot 11Al_2O_3$.

The active anode material can be a metal salt readily soluble in inert polar organic solvents which satisfy the above-stated solubility criterion. We particularly prefer chlorides perchlorates and hexafluorophosphates of alkali and alkaline-earth metals and of lanthanum.

Examples of such inert organic solvent, include the following: dimethylformamide, N,N'-dimethylacetamide, N-metylacetamide, gamma-butyrolactone, tetrahydrofurane and propylene carbonate.

To render the cathode conductive, in the event of the electron acceptor not being sufficiently conductive in itself, use can be made of a conductive auxiliary substance, e.g. graphite, mixed with the electron acceptor. Such a conductive substance can also be the metal of the salt serving as the electron acceptor.

Instead of directly contacting the liquid-impenetrable but permselective partition between the two compartments, the solid anode mass may be separated from that partition by an electrolyte consisting essentially of a solution, in a polar organic solvent, of at least one alkali metal (e.g., sodium) identical with a metallic constituent of the active anode material. This solution can be identical with or different from the electrolyte of the cathodic compartment. Its function is to facilitate the migration of the sodium ions from the anode to the dividing wall.

Figure 2:
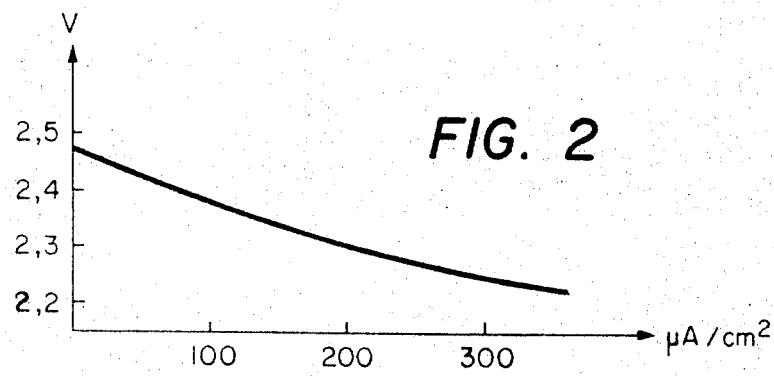
Figure 3:
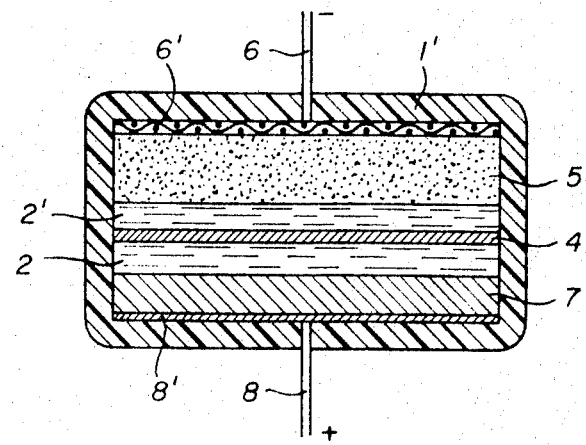

In the accompanying diagrammatic drawing:
FIG. 1 is a vertical section of a first embodiment of an electric accumulator according to the invention;
FIG. 2 shows a polarization graph corresponding to amperage and voltage measurements made during discharge of the accumulator of FIG. 1;
FIG. 3 is a vertical section of a second embodiment of an electric accumulator according to our invention.

The accumulator shown in FIG. 1 comprises a glass receptable 1 containing a saturated solution 2 of sodium chloride in dimethylformamide. A glass receptacle 3, smaller than the receptacle 1, is mounted inside the latter and partly dips into the solution 2. The lower end of the receptacle 3 is closed off by a plate 4 of sodium beta alumina, acting as a cation-permeable ceramic separator, and by a glass seal not shown. The receptacles 1 and 3 are filled with an atmosphere of inert gas, here pure argon. The receptacle 3 contains sodium 5 in the solid state acting as the accumulator anode.

A conductor 6, which consists of a platinum wire and which is in contact with the sodium, serves to connect the accumulator to an external load circuit, not shown. The cathode 7 of the accumulator is a flat disc of porous structure produced by sintering a mixture of nickel fluoride $NiF_2$ and metallic nickel, containing 34% by weight of $NiF_2$. This disc is placed in the solution 2, in substantially facing relationship with the plate 4, at a distance of 1 mm. from the latter. The cathode 7 is connected to the lead circuit by means of a conductor 8 constituted by a nickel wire.

The plate 4 of beta alumina can be produced, for instance, by simultaneous sintering and chemical reaction from pure alpha alumina and powdered sodium carbonate blended in suitable proportions to achieve an approximate final molar ratio of 11:1 of alumina and sodium oxide (approximate final composition:

$$Na_2O \cdot 11\ Al_2O_3)$$

The two powders are intimately mixed by a ball grinder and the mixture is compacted compressed with an isostatic press at a pressure of 25 metric tons per square centimeter in the form of a "carrot" of approximately cylindrical shape which is sintered for 4 hours in an oxidizing atmosphere at 1750° C. After sintering, the plate 4 is cut out of the carrot in the form of the flat disc of required size, here with a diameter of 1 cm. and a thickness of 1 mm.

The above-described accumulator operates at ambient temperature, as follows:

During discharge of the accumulator, the sodium of the anode is ionized at the interface between the anode 5 and the plate 4, giving off one electron for each sodium ion being formed. The electrons thus released are fed to the load circuit via the conductor 6. The sodium ions cross the wall 4 and then pass into the solution 2. At the cathode 7, the nickel fluoride is decomposed into its elements, accepting in so doing two electrons per $NiF_2$ molecule, with formation of metallic nickel which remains in the porous structure of the cathode 7 and $F^-$ ions which pass into the solution 2. The number of $F^-$ ions being formed is equal to that of the $Na^{++}$ ions passing into the solution 2. The overall chemical reaction is thus given by the following relationship:

$$2Na + NiF_2 \rightarrow 2Na^+ + 2F^- + Ni$$

and is the sum of the following two electrochemical reactions which respectively take place at the anode and at the cathode:

$$2Na \rightarrow 2Na^+ + 2e^-$$
$$NiF_2 + 2e^- \rightarrow Ni - 2F^-$$

The electrons are returned from the load to the cathode 7 by the conductor 8.

Thus, as the accumulator discharges, the sodium contained in the receptacle 3 is depleted, as is the nickel fluoride of the cathode, whereas metallic nickel forms at the cathode and the solution 2 becomes enriched with the anions and cations of the virtual reaction product, i.e. sodium fluoride.

The recharging of the accumulator is done by causing electric current to pass into the accumulator with a polarity supplying electrons to the anode 5 and removing electrons from the cathode 7, with the aid of an electric generator whose negative terminal is connected to the anode 5 and whose positive terminal is connected to the cathode 7. During charging, the aforedescribed reactions are reversed so that, at the cathode, the nickel is transformed into nickel fluoride, the solution 2 is depleted of sodium fluoride and metallic sodium forms in the receptacle 3.

The polarization graph shown in FIG. 2 has been drawn up on the basis of amperage and voltage measurements made during the discharge of the above-described accumulator. This graph shows that it is possible to obtain during discharge relatively high current densities with this kind of accumulator without causing a sharp potential drop.

In the accumulator illustrated in FIG. 3 the anodic compartment contains a solution 2 of an anode-metal salt, interposed between the solid anode 5 and the separator 4.

This accumulator comprises a stack of components in the form of flat discs. Its two electrolytic bodies 2, 2' are in the form of a paste or jelly obtained by means of an appropriate thickening agent (of the alginate, agar-agar or similar type), thus enabling them to be kept in place in the stack. The whole assembly is encased in a protective fluidtight shell of plastic material.

The bottom disc 8, made of nickel, has for instance a diameter of 2 cm. and a thickness of 0.025 mm. It acts as a cathodic current collector and is connected to the conductor 8 which is also of nickel. The cathode 7 is made of the same material as in the accumulator of FIG. 1 and is shaped as a disc having, for instance, a diameter of 2 cm. and a thickness of 0.2 mm.

The electrolyte 2 here consists of a saturated solution of sodium perchlorate in dimethylformamide. It is applied in the form of a layer of jelly having, for instance, a thickness of 0.2 mm.

The plate 4 has, for instance, a thickness of 0.05 mm. and a diameter of 2 cm. The solution 2', which here has the same composition as the solution 2, is placed between the plate 4 and the anode 5 in the form of a layer of jelly having, for example, a thickness of 0.05 mm. The solution 2' could also have a composition other than that of the solution 2 and could in particular include a more effective solvent for the anode-metal salts.

The sodium anode 5 is a disc having a thickness of 0.2 mm. and a diameter of 1 cm. A grid 6' of copper wires having a diameter of 0.015 mm. acts as an anodic current collector and is connected to the copper lead 6. The whole arrangement is encased in a fluidtight shell 1' made of an appropriate organic polymer and molded in a protective atmosphere after assembly of the above-described components.

Accumulators according to the invention can, if required, be connected to one another in series and/or in parallel so as to form a battery of desired electromotive force and capacity.

What is claimed is:

1. An electric accumulator comprising:
   a container divided into an anodic compartment and a cathodic compartment;
   an anode in said anodic compartment with a metallic constituent consisting essentially of an alkali metal, an alkaline-earth metal or lanthanum;
   a cathode in said cathodic compartment having an electronically conductive structure incorporating a cathodically reducible metal compound;
   a solid fluidtight partition between said compartments, said partition consisting of a beta alumina whose composition includes an oxide of the metal of said metallic constituent; and
   an electrolyte in said cathodic compartment consisting essentially of a solution of a salt of said metal in an organic solvent capable of dissolving a reaction product of said metal and anions of said reducible metal compound.

2. An accumulator as defined in claim 1 wherein said metal is sodium.

3. An accumulator as defined in claim 1 wherein said anode is in direct contact with said partition.

4. An accumulator as defined in claim 1 wherein said constituent consists essentially of lithium, sodium, potassium or rubidium.

5. An accumulator as defined in claim 1 wherein said constituent consists essentially of calcium, strontium or barium.

6. An accumulator as defined in claim 1 wherein said reducible metal compound is a halide, an oxide or a sulphide of a transition metal, silver or mercury.

7. An accumulator as defined in claim 1 wherein the salt dissolved in said elcetrolyte is a chloride, a perchlorate or a hexafluorophosphate.

8. An accumulator as defined in claim 1 wherein said solvent is dimethylformamide, N,N'-dimethylacetamide, N-methylacetamide, gamma-butyrolactone, tetrahydrofurane or propylene carbonate.

9. An accumulator as defined in claim 1 wherein said cathode includes an ancillary conductor distributed throughout said structure.

10. An accumulator as defined in claim 1, further comprising an electrolytic body in said anodic compartment interposed between said anode and said partition, said body consisting essentially of a solution of the salt of said constituent in an organic solvent.

11. An accumulator as defined in claim 1 wherein said beta alumina has substantially one of the following compositions: $Na_2O \cdot 11Al_2O_3$, $K_2O \cdot 11Al_2O_3$, $Rb_2O \cdot 11Al_2O_3$, $Cs_2O \cdot 11Al_2O_3$, $Li_2O \cdot 11Al_2O_3$, $CaO \cdot 6Al_2O_3$ and $$La_2O_3 \cdot 11Al_2O_3.$$

12. An accumulator as defined in claim 11 wherein said beta alumina has substantially the composition $Na_2O \cdot 11Al_2O_3$, said metallic constituent being sodium.

13. An accumulator as defined in claim 12 wherein said reducible metal compound is $NiF_2$.

14. An accumulator as defined in claim 13 wherein said cathode includes metallic nickel distributed throughout said structure.

15. An accumulator as defined in claim 13 wherein said solvent is dimethylformamide.

16. An accumulator as defined in claim 6 wherein said transition metal is iron, nickel, cobalt, chromium, copper or vanadium.

17. An accumulator as defined in claim 6 wherein said reducible metal compound is a fluoride.

18. An accumulator as defined in claim 17 wherein said fluoride is $FeF_2$, $FeF_3$, $CuF_2$, $NiF_2$ or $CoF_3$.

19. An accumulator as defined in claim 7 wherein said salt is sodium chloride in saturating concentration.

20. An accumulator as defined in claim 9 wherein said ancillary conductor is a metal corresponding to the metallic component of said reducible metal compound.

References Cited

UNITED STATES PATENTS

| | | | |
|---|---|---|---|
| 3,531,328 | 9/1970 | Bro et al. | 136—100 R |
| 3,542,601 | 11/1970 | Gabano | 136—100 R |
| 3,413,154 | 11/1968 | Rao | 136—83 R |
| 3,110,630 | 11/1963 | Wolfe, Jr. | 136—6 |
| 3,554,806 | 1/1971 | Greenberg et al. | 136—6 |
| 3,535,163 | 10/1970 | Dzieciuch et al. | 136—6 |
| 3,458,356 | 7/1969 | Kummer et al. | 136—6 |
| 3,375,139 | 3/1968 | Tschinkel et al. | 136—86 |
| 3,446,668 | 5/1969 | Arrance et al. | 136—146 |
| 3,575,727 | 4/1971 | Arrance et al. | 136—146 |

WINSTON A. DOUGLAS, Primary Examiner

C. F. LE FEVOUR, Assistant Examiner

Dedication 3,730,771.—*Helmut Tannenberger*, Geneva, and *Jean-Claude Charbonnier*, Chene-Bougeries, Switzerland. ELECTRIC ACCUMULATOR. Patent dated May 1, 1973. Dedication filed Mar. 26, 1984, by the assignee, *Battelle Memorial Institute*.

Hereby dedicates to the People of the United States the entire remaining term of said patent.

[*Official Gazette May 29, 1984.*]